UNITED STATES PATENT OFFICE.

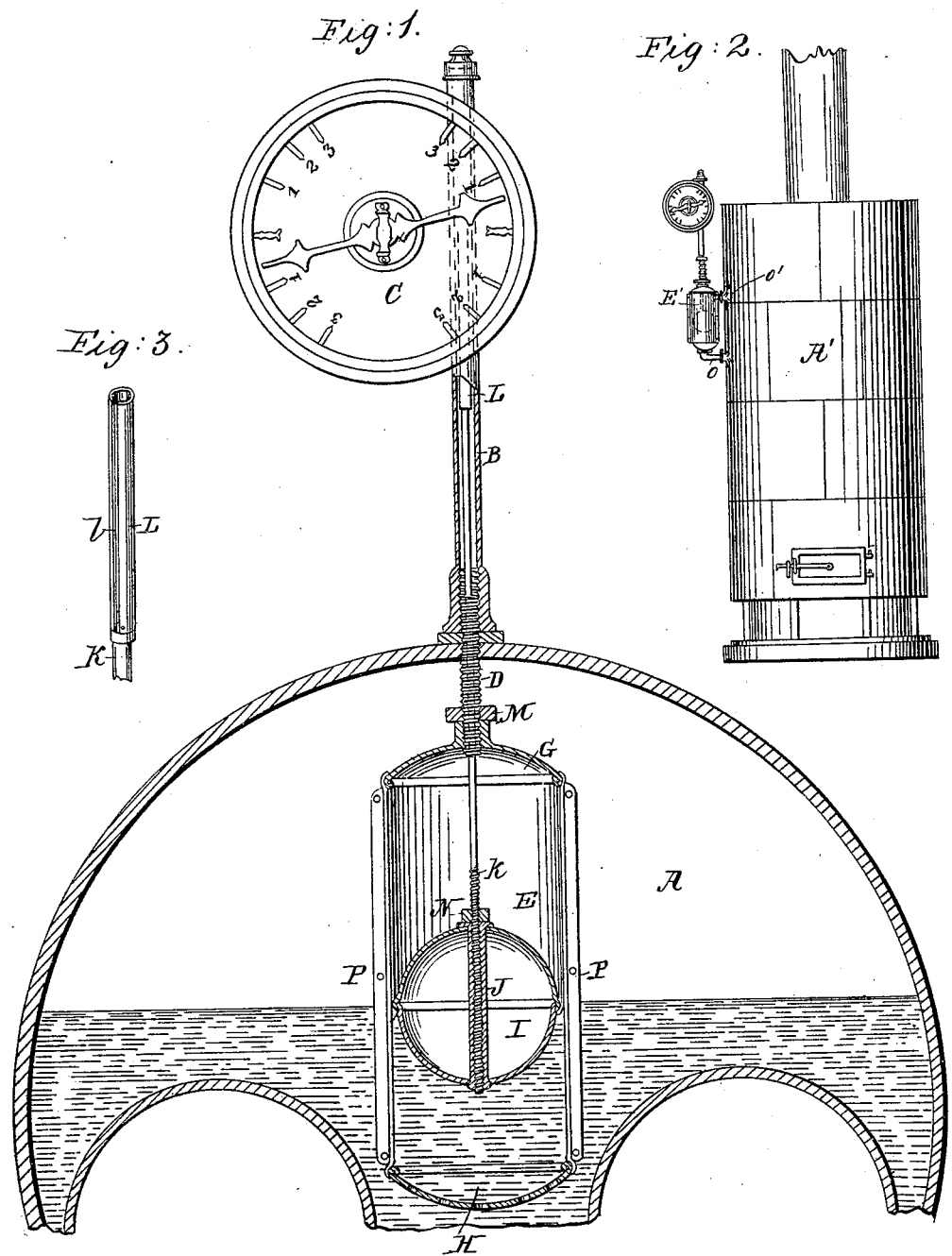

CHARLES F. HENIS, OF CINCINNATI, OHIO.

IMPROVEMENT IN WATER-GAGES.

Specification forming part of Letters Patent No. 50,581, dated October 24, 1865.

*To all whom it may concern:*

Be it known that I, CHARLES F. HENIS, of Cincinnati, Hamilton county, Ohio, have invented a new and useful Improvement in Water-Gages; and I do hereby declare the following to be a full, clear, and exact description thereof, reference being had to the accompanying drawings, making part of this specification.

My invention relates to, first, provisions for guarding or protecting the float-rod from liability to be bent or deflected by currents of steam or of water within the boiler or by sudden swaying of the latter, particularly in seagoing vessels; secondly, an improved form of magnet for water-gages.

Figure 1 is a partly sectionized elevation of a gage embodying my invention. Fig. 2 shows the same applied to a vertical boiler. Fig. 3 exhibits the magnet detached.

A represents a common horizontal boiler. B is a hollow column attached vertically to the top of the boiler and supporting at its upper part a dial, C, having a customary magnetized needle. The lower portion of the interior of the column B is screw-threaded to receive a correspondingly screw-threaded hollow stem, D.

E is a cylindrical cage or box having a screw-threaded neck, F, by which it is attached to the lower end of the stem D. The cage E is closed at top and bottom, respectively, by heads G and H, of which the lower head, H, is perforated, so as to enable the water to occupy the cage at the same level as in the boiler, but so as to prevent a too sudden filling and emptying of the cage by any agitation of the boiler or of its contents.

My float I is composed of two hemispheres of sheet metal, double-seamed and brazed together at $j$, and containing a hollow screw-threaded stay, J, whose ends pass through and are riveted outside of the sphere. The stay J receives a screw-threaded rod, K, which rod passes upward through the hollow stem D and hollow column B, and is surmounted by a magnet, L, the same being a cylindrical tube with a longitudinal slit or parting, $l$, down one side thereof.

The provision of the cage effectually prevents the bending and distortion of the float-rod by violent currents of escaping steam and by the swashing to and fro of the water in a boiler, by which water-gages are so often rendered worse than useless, adding to, instead of lessening the danger of, explosions by giving false indications.

The form of magnet adopted by me and herein represented is one which I have found to retain magnetic force several times longer than any other.

It will be seen that the screws D and K enable the vertical adjustment of the shell and of the float, respectively, while the nuts M and N enable the retention of these parts to any particular adjustment.

I claim herein as new and of my invention—

1. The combination and arrangement of the cage or guard E with the float I, for the purpose set forth.

2. The combination and arrangement of the screws D and K and nuts M and N for the vertical adjustment of the cage and float, respectively.

In testimony of which invention I hereunto set my hand.

CHARLES F. HENIS.

Witnesses:
GEO. H. KNIGHT,
JAMES H. LAYMAN.